Jan. 26, 1943.   W. M. SCHWEICKART ET AL   2,309,418
CONVEYING APPARATUS
Filed Aug. 1, 1940   2 Sheets—Sheet 1
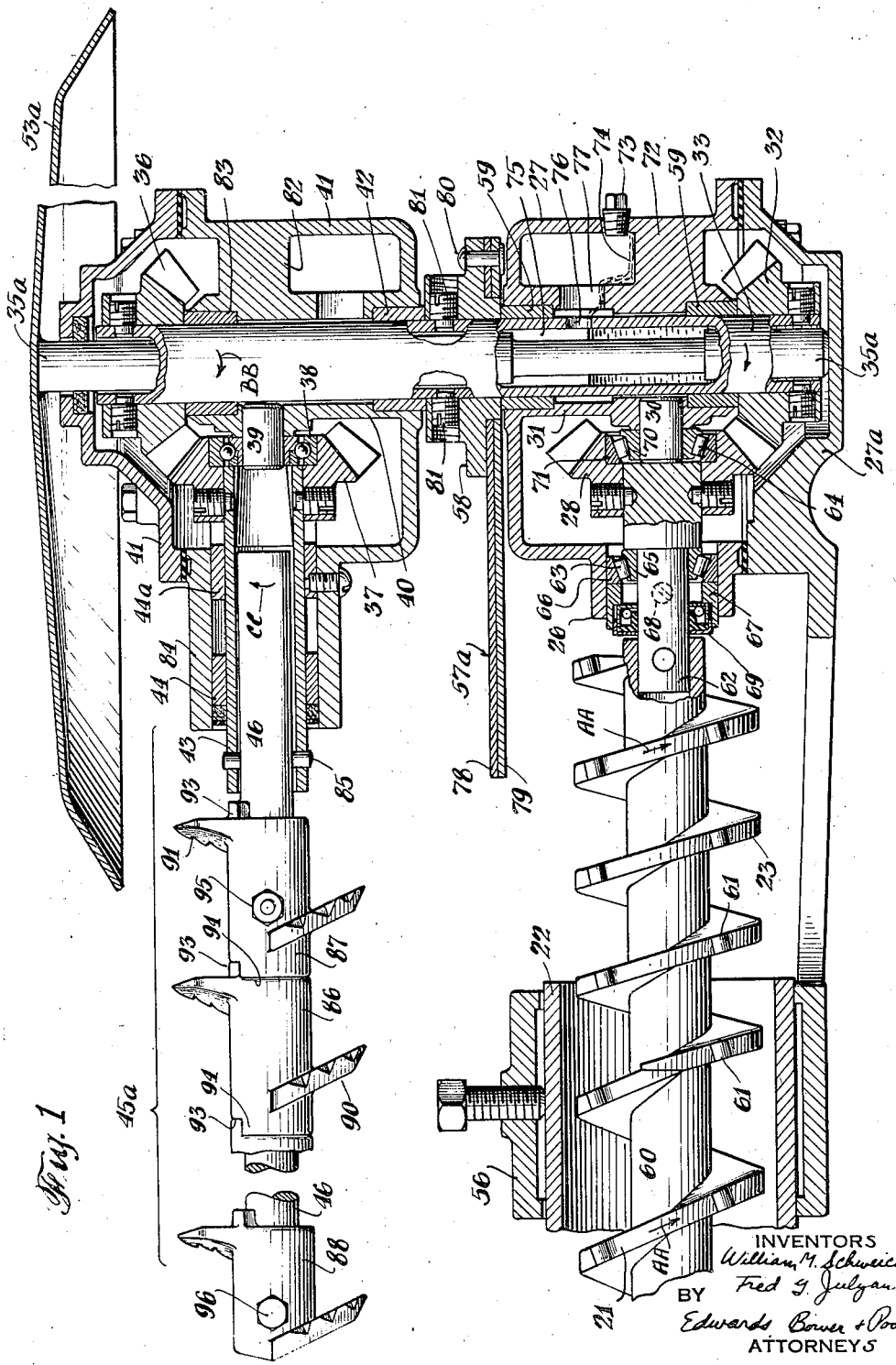

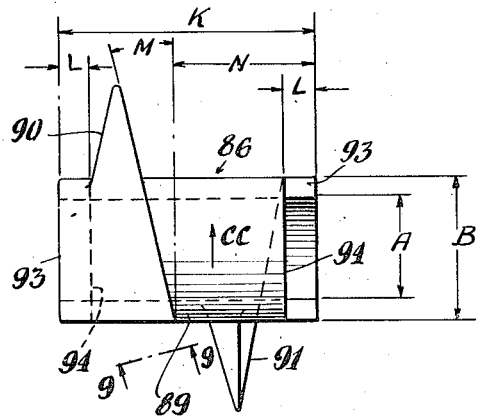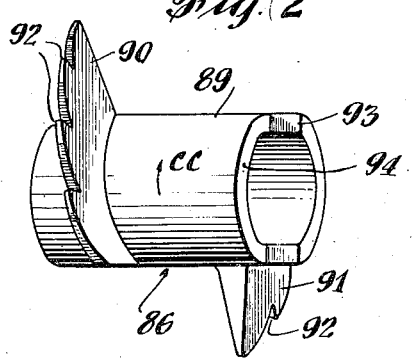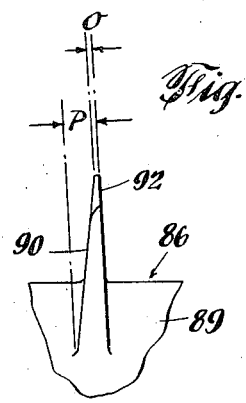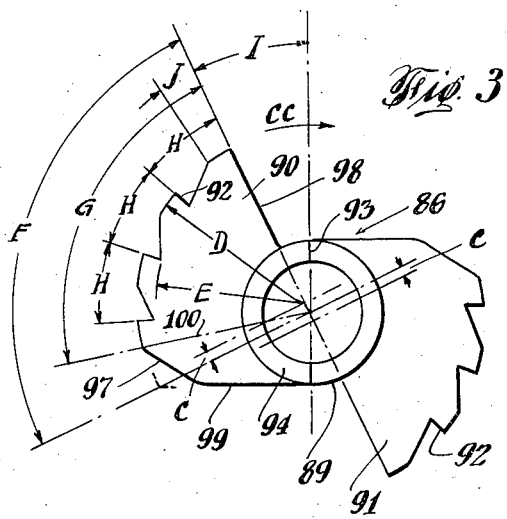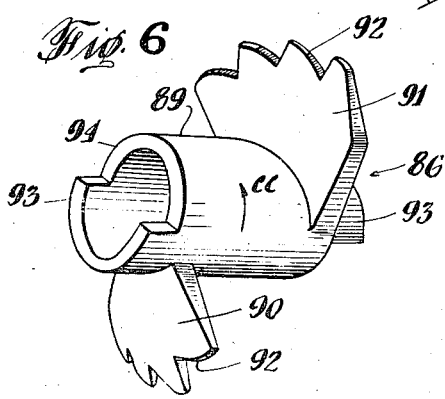

Patented Jan. 26, 1943

2,309,418

UNITED STATES PATENT OFFICE 2,309,418

CONVEYING APPARATUS

William M. Schweickart and Fred G. Julyan, Euclid, Ohio, assignors to Pocahontas Fuel Company Incorporated, New York, N. Y., a corporation of Virginia Application August 1, 1940, Serial No. 349,348

2 Claims. (Cl. 198—213)

This invention relates to improvements in apparatus for collecting and conveying coal and the like, and is particularly directed to a system operable beneath an accumulation of coal for transferring the coal from a substantial area to the inlet of a conveyor system. It is particularly suitable for operation in a coal bin to provide a constant and dependable supply of coal to a conveyor preferably of the worm or screw type, which feeds the coal to a furnace.

In installations of this type, proper feeding of the coal is highly important for the purpose of assuring proper burner operation, for economy in driving the feed screws, and to avoid the jamming of the feed which has heretofore been a prolific source of trouble in apparatus of this type.

The object of the invention is to overcome these difficulties and provide a uniform feed to the main conveyor regardless of the depth and condition of the coal. A more specific object is to supply a device for collecting the coal from a substantial area that will avoid the bridging of the coal and the jamming or stoppage of the feed, and the present invention is an improvement of applicants' prior device shown in Patent No. 2,233,085.

Other objects and advantages of the invention will appear from the following description considered in connection with the accompanying drawings, in which, Fig. 1 is a vertical longitudinal section of a collector unit;

Fig. 2 is a perspective view of one of the collector blade sections or pick-up flights shown in Fig. 1;

Fig. 3 is an end view of the pick-up flight of Fig. 2;

Fig. 4 is a side elevation of the pick-up flight of Fig. 2;

Fig. 5 is a fragmental bottom view of the pick-up flight of Fig. 2, taken as indicated by the arrows 9—9 of Fig. 4; and Fig. 6 is a perspective view of the pick-up flight of Fig. 2 from another angle and after the pick-up flight has been rotated about its axis from the position shown in Fig. 2.

The coal collector unit is adapted to be mounted in a coal bin and has a rotating collector arm differentially rotating and swinging to gather and draw the coal to a feed pocket at the end of the coal feed tube, as illustrated in Fig. 1 and in the apparatus of applicants' Patent 2,233,085 on which this present case is an improvement. The bin collector unit is driven from the main coal feed screw 21 rotating in the coal feed tube 22 and having a suitable drive connection with a vertical rotating drive sleeve 33 carrying a planetary drive for the collector arm. In the form illustrated, the tubular end of feed screw 21 is coupled to pick-up screw section 23 in appropriate manner and the end of the coal feed tube 22 is adjustably clamped to the collector by the integral mounting collar 56.

The pick-up screw 23 has its screw flight welded upon an extension of the core or shaft portion 60 of the coal screw 21. The coal and pick-up screws 21, 23 are preferably provided with a series of projections 61 along the edge of the screw blade as particularly described in the application of William M. Schweickart, Serial No. 335,564, filed May 16, 1940, these projections greatly facilitating the handling and conveying of wet or moist fine coal.

The outer end of pick-up screw 23 is bolted to one end of a shaft 62 on the other end of which is mounted the bevel gear 28. Roller bearings 63 and 64 rotatably support shaft 62 and absorb any thrusts to which it is subjected. Bearing 63 consists of an inner bearing cone 65 mounted on the shaft 62 and against a shoulder thereon, an outer bearing cone 66 mounted in the cylindrical opening in the extension 26 of the base housing 27, and suitable rollers positioned between the bearing cones. The position of outer bearing cone 66 is adjustable by the bearing take-up ring 67, this ring being secured to the housing 27 by a set screw 68 threaded in the extension 26. Surrounding the shaft 62 and between the shaft and the take-up ring 67 is a suitable seal 69 for keeping coal and dust out of the bearings and for preventing the oil or other gear and bearing lubricant from leaking out of the housing 27.

Bearing 64 consists of an inner bearing cone 70 mounted on the stud 30, an outer bearing cone 71 mounted on the bevel gear 28 and in a suitable pocket therein, and suitable rollers positioned between the bearing cones. The hub sleeve 31 in which th stud 30 is mounted is an interior sleeve formation of base housing 27 extending downwardly from the top of the housing, and is preferably connected near its lower end to the body of the base housing by one or more spokes or ribs 72. Base housing 27 is secured to the base 27a which rests on the floor of the bin and has an extension formed with a collar 56 for clamping on to the end of the coal feed tube 22.

Bevel gear 28 meshes with and drives the bevel gear 32 which is mounted at the lower end of the tubular shaft or sleeve 33. The sleeve 33 is rotatably supported by the bushings 59 in the base housing 27 and extends vertically out of the lower housing 27 and up into the upper housing 41. With the direction of rotation of the coal and pick-up screws 21, 23 as shown by the arrows AA, the direction of rotation of the sleeve 33 is that shown by the arrows BB.

Within the sleeve 33 is positioned the cover shaft or disc-supporting standard 35a, the lower end of which abuts against the bottom of the base 27a. The upper end of the standard 35a is welded to a cover, disc or hat 53a, which is preferably a steel stamping.

The lower housing 27 is provided with an oil hole and plug 73 and the normal level of the oil 74 in the housing is the lower edge of the oil hole. The diameter of the cover shaft 35a is a little less than the inside diameter of sleeve 33 throughout the length of the shaft 35a, except for a region above and below the normal oil level, in which region the diameter of the cover shaft 35a is substantially less than the inside diameter of the sleeve 33, thereby providing an annular chamber 75 between the sleeve 33 and shaft 35a. An aperture 76 is provided in the sleeve 33 to form a passageway from the chamber 75 to the outside of the sleeve. An aperture 77 is provided in the hub sleeve 31 of the lower housing 27 to form a passageway from the outside of sleeve 33 to the main body of oil contained within the base housing 27. As a result of this construction relief is provided for the oil subjected to the pumping action of the parts within the base housing 27. This pumping action tends to force oil upwardly between the shaft 35a and sleeve 33 during the operation of the collector, and the relief consists in having the oil first rise in the chamber 75 to the level of the passageway 76 and thereupon pass through the passageways 76 and 77 back to the main body of oil. There is thus no loss of oil from the lower housing due to any inherent pumping action of the parts.

The blade or paddle 57a is shown as formed of two suitable shaped flat plates 78, 79 positioned face to face and suitably secured to the hub 58, as by a plurality of rivets 80. A single plate of suitable thickness may be employed if desired. The leading edge of the paddle 57a preferably has applied to it an abrasive resisting material. The hub 58 is secured to drive sleeve 33 by a plurality of set screws 81, the inner ends of which are preferably pin-like cylinders of reduced diameter fitting into suitable apertures in the drive sleeve 33. This construction not only secures the hub 58 to the drive sleeve but also enables the hub to support the upper housing 41.

The upper housing 41 has an interior sleeve formation or hub 40 extending upwardly from the bottom of the housing and is preferably connected near its upper end to the body of the upper housing by one or more spokes or ribs 82. Housing sleeve 40 surrounds the drive sleeve 33 and is rotatably mounted thereon, suitable bushings or bearings 42, 83 being provided respectively at the bottom and top of the housing sleeve 40. The bottom face of the lower bushing 42 engages the top face of the hub 58 and the upper face of this lower bushing abuts against a shoulder in the hub 40, so that the housing 41 is supported upon hub 58 through the lower bushing 42.

Within the upper housing 41 is the bevel gearing 36, 37, the gear 36 being secured to drive sleeve 33 near its top and the gear 37 having its axis horizontal and below gear 36. Gear 37 is rotatably supported on stud 39 by the ball bearing 38 and is mounted upon a connecting sleeve 43 at the inner end thereof. This sleeve is rotatably supported within a tubular extension 84 of the upper housing 41 by means of two bushings 44, 44a. The sleeve 43 projects outside extension 84, where it is suitably connected, as by the pin 85, to the outrigger shaft 46. The inner end of this shaft is positioned in sleeve 43 and extends inwardly a substantial distance. Mounted on the outer end of outrigger shaft 46 and secured thereto are the pick-up units or coal impelling elements 86, 87 and 88, the parts together forming the coal collector arm 45a. With the drive sleeve 33 rotating in the direction shown by the arrows BB, the direction of rotation of the outrigger shaft 46 and of the coal collector arm 45a is that shown by the arrows CC.

The pick-up units 87 and 88 are the end units at the inner and outer ends, respectively, of the collector arm, while the units 86 are the intermediate units, there being a substantial number of such intermediate units, for example, seven for a 24-inch collector unit and ten for a thirty-inch collector unit.

Referring now to Figs. 2 to 6, inclusive, showing an individual intermediate pick-up unit 86 unmounted upon the outrigger shaft, the unit comprises a tubular hub 89 having integral therewith two blades, interrupted flights or paddles 90, 91. These blades are substantially diammetrically opposed about the axis of the unit (see Fig. 3), are longitudinally displaced along the axis of the unit (see Figs. 2, 4 and 6), and are in planes inclined with respect to the axis of the unit so that coal is advanced longitudinally along the axis of the unit as the unit rotates about its axis.

The blades 90, 91 being similar in formation, a detailed description of one suffices.

The blade 90 subtends approximately a right angle at the axis of the unit (see Fig. 3) and is thinner at and near the outer edge than at the hub so that the edge is relatively sharp and knifelike (see Figs. 2, 4 and 5) and the outer edge of the blade is serrated or notched to provide saw teeth 92 therealong facing in the general direction of rotation of the unit. These teeth 92 are relatively coarse, that is, relatively few in number and relatively long radially, and the teeth are relatively thin throughout their radial length.

The hubs 89 of all the pick-up units 86, 87 and 88 have interlocks, such as tongues 93 and recesses 94, the end pick-up units 87 and 88 are secured to the outrigger shaft 46 by the bolts 95, 96 respectively, and the blades on the end pick-up units 87 and 88 are similar to those for the intermediate pick-up units 86. Thus the individual pick-up units together form a series of separate helically inclined blades on the outrigger shaft 46, with these blades moving with the outrigger shaft 46 as it rotates about its axis to feed coal inwardly toward the vertical axis of the collector (i. e., the axis of drive sleeve 33), and with these blades moving with the outrigger shaft 46 as it rotates about such vertical axis to advance the blades into a fresh supply of coal.

As a result of the above construction for the pick-up units, the collector is particularly effective to collect coal and convey it to the coal conveyor 21, 22, especially when the coal is fine (such as coal slack) and wet. The thin sharp outer edges on the blades cut into the wall of coal ahead of the collector arm 45a so that the collector arm continues to advance around the vertical axis of the collector (i. e., the axis of drive sleeve 33) and feed coal even when the collector arm encounters tightly packed coal, such as wet or damp slack. The teeth 92 along the outer edges of the blades agitate the coal engaged by the blades and dislodge obstructions therein, such as coarse (i. e., pea-sized) particles of coal embedded in the slack, tending to hinder the advance of the collector arm 45a and cause such particles to move out of the path of the collector arm so that the collector arm continues to advance and feed coal even when it encounters obstructions in the coal. The sharp edges and thin teeth also serve to prevent overloading of the collector unit. Thus, the rotation of the collector arm 45a about its own axis tends to pack the coal beneath the collector arm, and this tends to produce an upward thrust upon the collector arm. When the level of the coal in the bin becomes low so that the weight of the coal above the collector arm is insufficient to counteract this upward thrust, this upward thrust must be borne by the collector itself. In such case the load on the collector substantially increases and the outrigger shaft 46 is subjected to severe strain—in some cases causing breakage of the outrigger shaft. In preventing this, the sharp edges and teeth on the blades of the pick-up units described cut into the coal tending to pack beneath the collector arm instead of being supported by such coal, thereby reducing some of the upward thrust on the collector arm, and the teeth, being thin at their bases as well as at their tops, are unable to stabilize the coarse particles in such coal with the result that the coal collector arm does not tend to climb and ride up over such particles, thereby also reducing some of the upward thrust on the coal collector arm.

Thus, as a result of the above construction for the blades of the pick-up units, these units insure a continuous feed of fine wet coal without injury to the collector unit. As an example, these pick-up units have been especially effective in collectors handling fine bituminous coal on the order of ⅛ and ¼ inch slack and containing some coarse pea-sized particles and having a moisture content around 8% and over.

As an example of a pick-up unit embodying the above features, the following details are given for the pick-up unit 86 shown in Figs. 2–6 inclusive:

A. Inside diameter of hub 89_____inches__ 1¾₆
B. Outside diameter of hub 89_____do____ 1⅛
C. Offset of centers for outer edge of blades 90, 91 and for bases of teeth 92 inches__ 1⁄16
D. Radius to outer edge of blades 90, 91 inches 1⅜
E. Radius to bases of teeth 92_____do____ 1³⁄₁₆
F. Angle subtended by blades 90, 91 neglecting the corner-eliminating face 97_____degrees__ 90
G. Angle subtended by outer edge of blade degrees__ 75
H. Angular distance between front faces of teeth 92_____degrees__ 22½
I. Angle between front edge 98 of blade 90 and line through axis of unit perpendicular to rear face 99 of blade 90_____degrees__ 25
J. Length of unnotched outer edge of blade between adjacent teeth 92__inches__ 3⁄16
K. Overall axial length of pick-up unit 86 inches__ 2¹⁄₃₂
L. Axial length of tongue 93_____do____ ¼
M. Angle of working face of blades 90, 91 with respect to plane transverse to axis of pick-up unit (this working face being a plane surface with the radius 100 from the axis of the pick-up unit to the rear end of the outer edge of the blade lying within such plane surface)_____degrees__ 12
N. Distance axially along hub 89 between its innermost edge and the nearest point on the working face of blade 90_____inches__ 1⁵⁄₃₂
O. Thickness of blades 90, 91 at outer edge inches__ 1⁄32
P. Thickness of blades 90, 91 at hub 89 inches__ ¼

The pick-up units of the foregoing proportions are especially suitable for collecting and feeding coal to pick up and coal screws 21, 23 having an outside diameter of 2⅝" (including projections 61 each having a height of 3⁄32"), and a shaft diameter of 1⅛", with coal tube 22 having an inside diameter of 3", with the pitch of pick-up screw 23 being 1½" and with the pitch of coal screw 21 being 2¼".

We claim:

1. In a coal collector arm rotating around a horizontal axis and swinging around a vertical axis, a series of pickup flights along said arm comprising hub portions and spaced blade portions with each blade subtending approximately a right angle at the horizontal axis of the arm and tapered from relative thickness at the hub to sharpness at the outer edge and notched at the sharp outer edge to provide coarse saw teeth facing in the direction of rotation and of the swinging movement of the arm when viewed from above.

2. Collector apparatus as set forth in claim 1 in which each tooth of the pickup blades subtends an arc of about 20° and has a length of unnotched outer edge trailing the point of the tooth.

WILLIAM M. SCHWEICKART.
FRED G. JULYAN.